United States Patent Office 3,735,006
Patented May 22, 1973

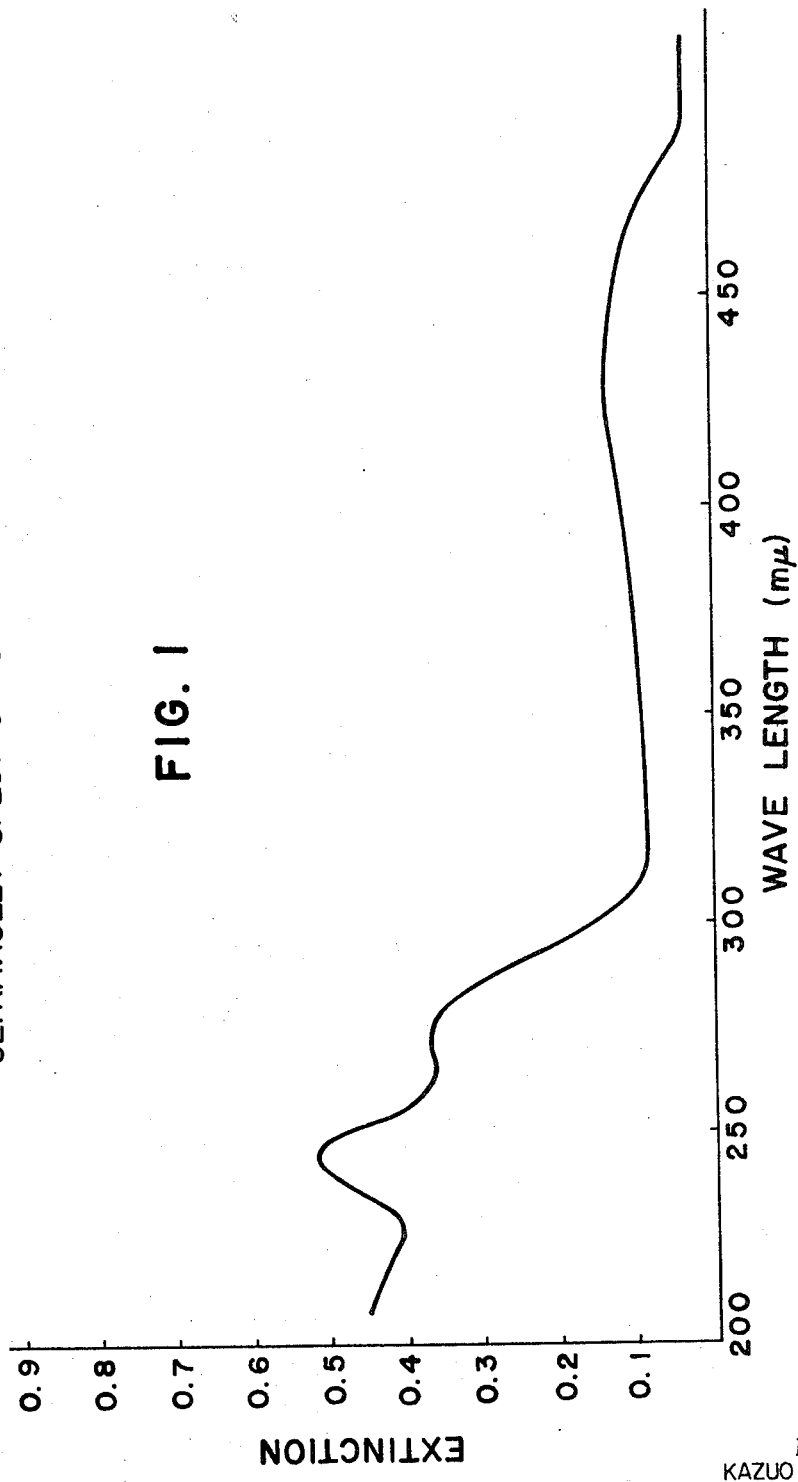

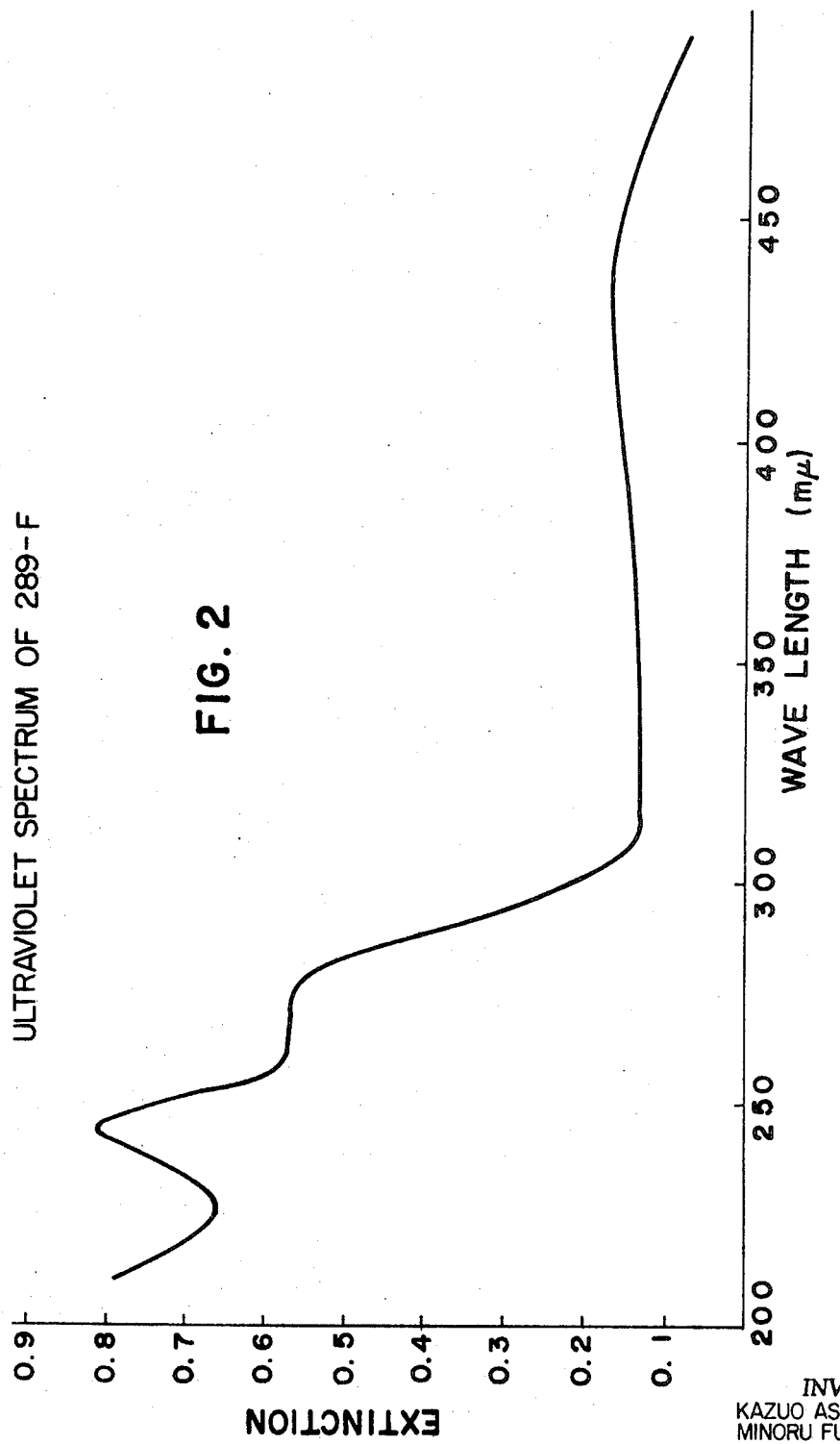

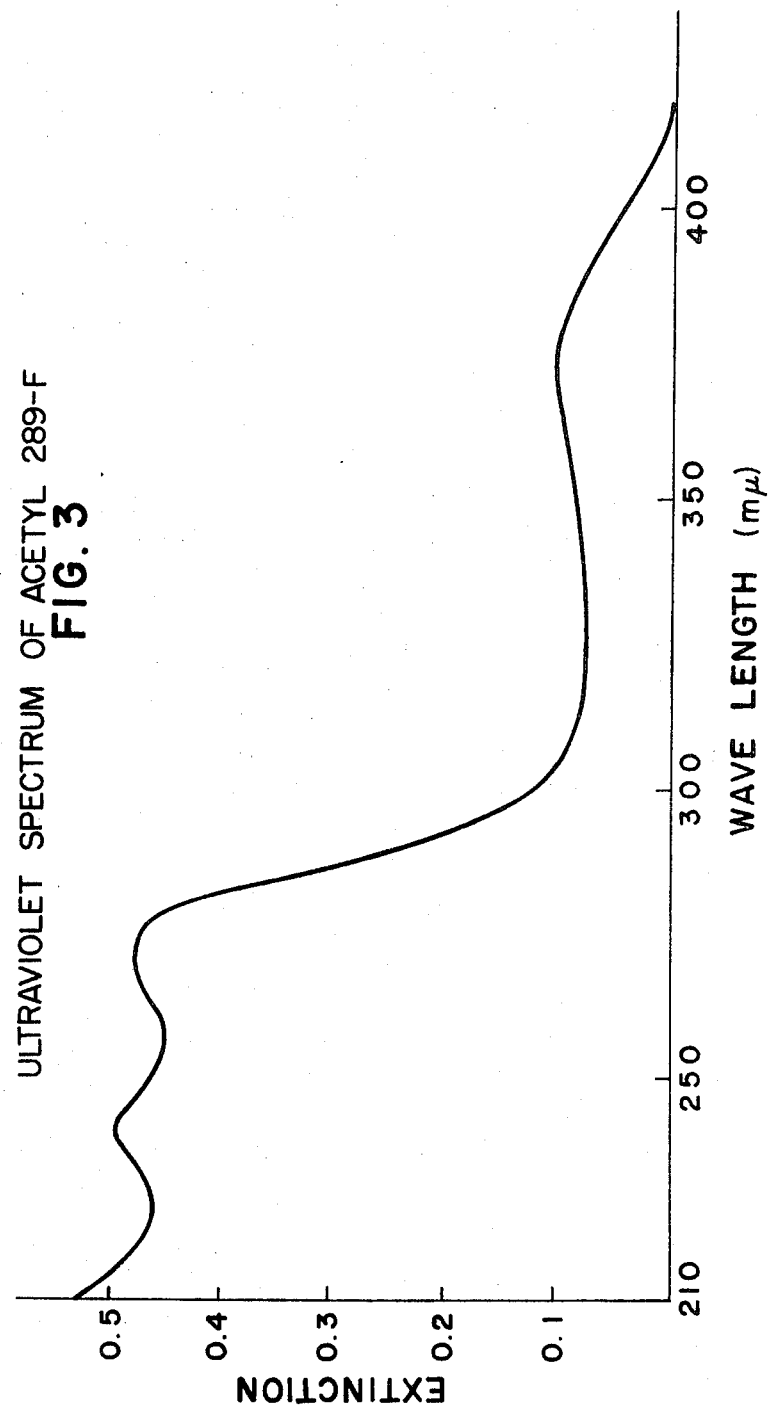

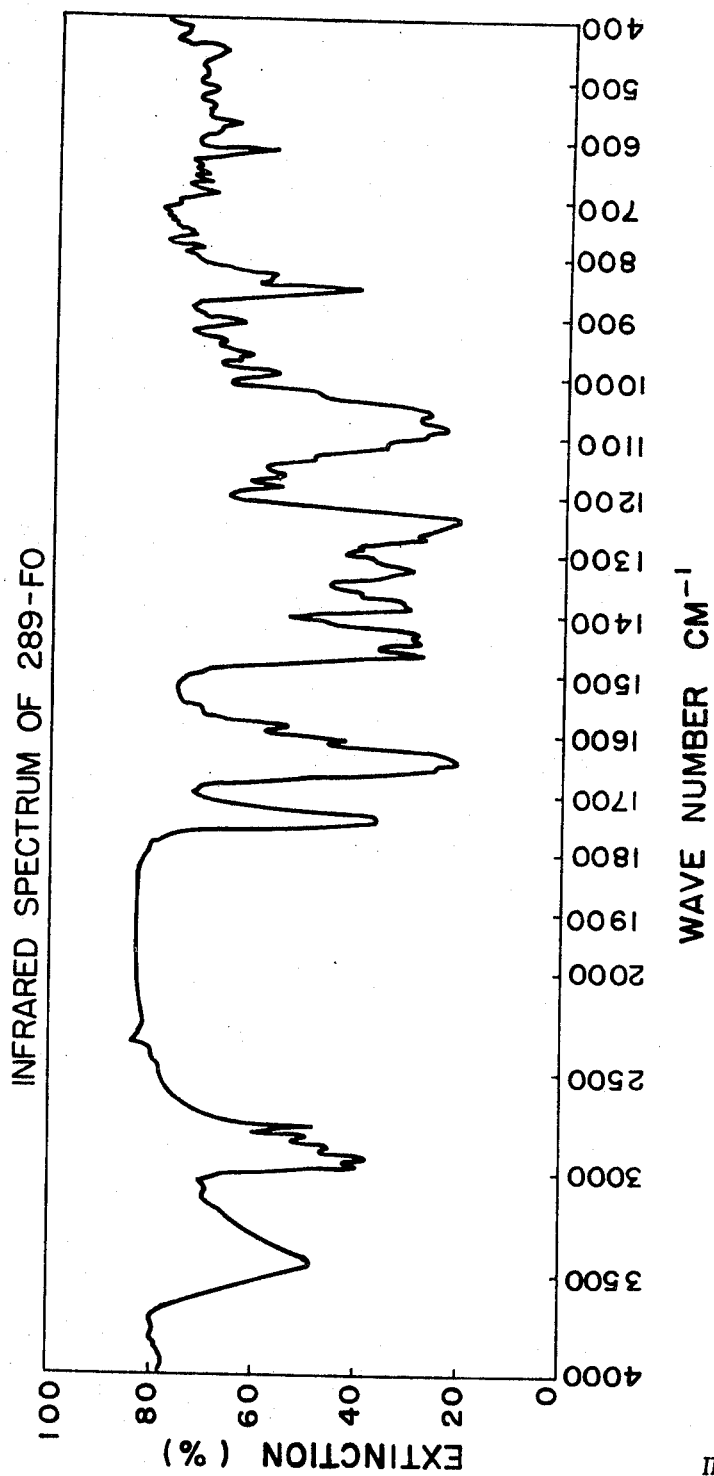
FIG. 4 INFRARED SPECTRUM OF 289-FO

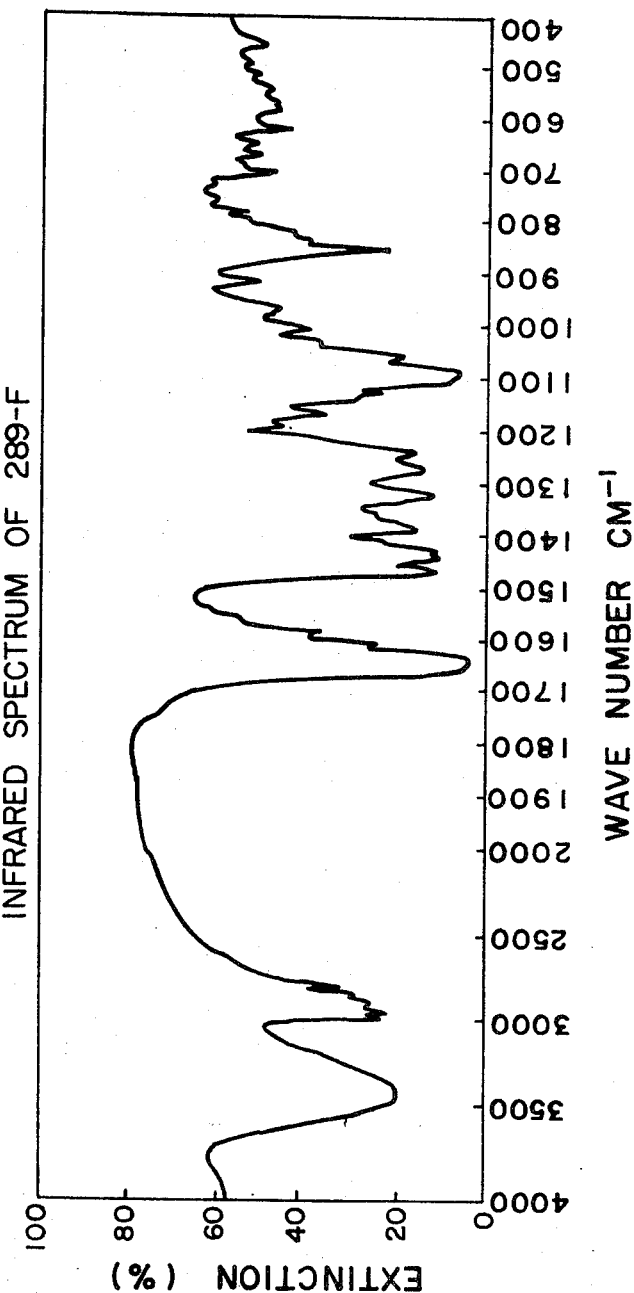

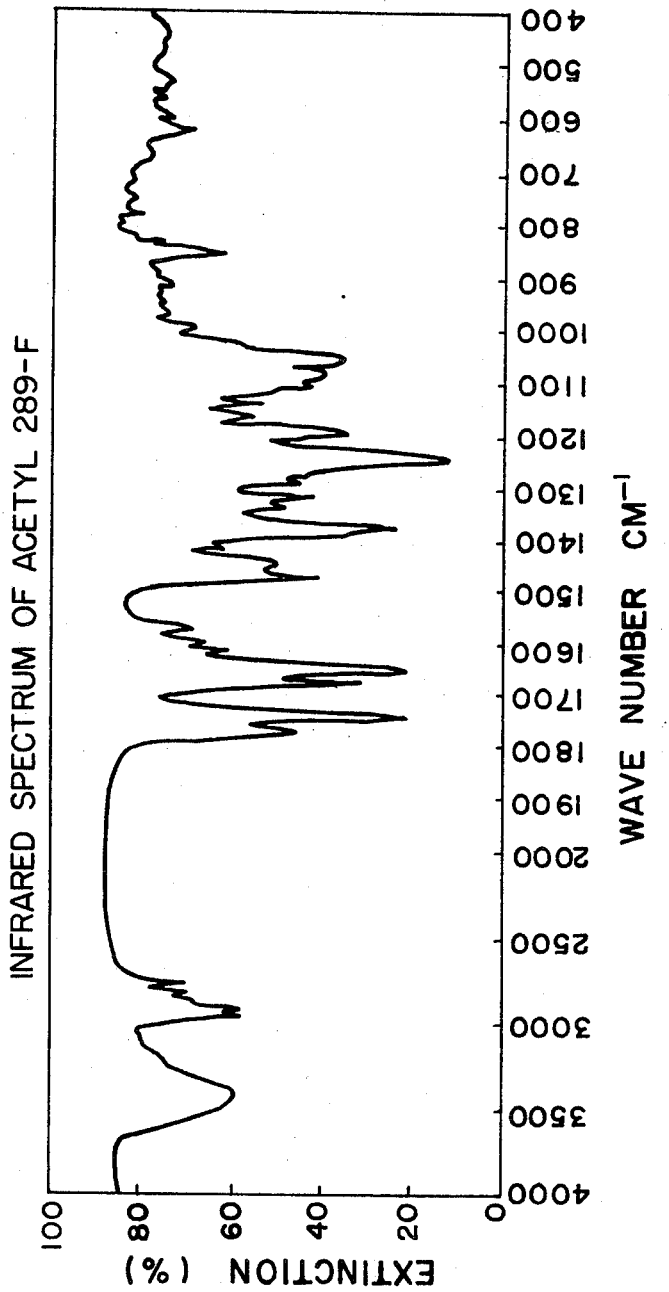

3,735,006
**NOVEL ANTIBIOTICS PRODUCED FROM THE STRAINS OF *STREPTOMYCES PHAEOVERTICILLATUS* AND THEIR METHOD OF PREPARATION**
Kazuo Asano, Ibaraki-shi, Minoru Furukawa, Kyoto-shi, and Nobuo Kanda, Osaka-shi, Japan, assignors to Daiichi Seiyaku Company, Limited, Tokyo, Japan
Filed July 25, 1969, Ser. No. 844,862
Claims priority, application Japan, Nov. 20, 1968, 43/84,502
Int. Cl. A61k 21/00; C12b 1/00; C12k 1/00
U.S. Cl. 424—122      21 Claims

ABSTRACT OF THE DISCLOSURE

Two antibiotic substances are produced by cultivation of strains of *Streptomyces phaeoverticillatus*, preferably newly separated strains of *Streptomyces phaeoverticillatus* var. *takatsukiensis* (ATCC 21395, 21396 and 21397) in a nutrient medium containing anthraquinone sulfonic acid or metal salts thereof. Each of the above antibiotics afforded the same acetylated derivative.

These three substances, 289-FO, 289-F and Acetyl 289-F, have an inhibitory activity against the growth of certain microorganisms, including bacteria.

---

This invention relates to novel and useful antibiotic substances, provisionally called 289-FO, 289-F and Acetyl 289-F, and to the production thereof.

More particularly, this invention relates to processes for the production of antibiotics by fermentation and for their recovery in pure crystalline states. It further relates to the production of Acetyl 289-F, the corresponding acetylated derivative of both antibiotic substances.

An object of this invention is to provide new antibiotic substances, 289-FO, 289-F and Acetyl 289-F, which are effective in inhibiting the growth of gram-positive and gram-negative bacteria, and are also useful in inhibiting Ehrlich ascites carcinoma of mice.

One of the novel antibiotic substances, 289-F, was first isolated from a culture broth of *Streptomyces phaeoverticillatus* var. *takatsukiensis* (ATCC 21395, 21396 and 21397).

It has been discovered that 289-F accumulates in the culture broth in a substantial amount only when anthraquinone sulfonic acid derivatives or salts thereof are previously added to the cultivation medium.

During further study on the accumulation of 289-F in the broth, it was found that sufficient accumulation of 289-F is preceded by the accumulation of another antibiotic substance, 289-FO, in the culture broth. Therefore, either substance may be produced by the fermentation of said strains by controlling the fermentation time.

Both 289-FO and 289-F are obtained as pure crystals and possess several physical and chemical properties as hereinafter set forth. However, their chemical structures have not as yet been clarified. Both 289-FO and 289-F give the same acetylated derivative by treatment with acetic anhydride. From this fact and the tracing of accumulations of each in the broth, it is suggested that the chemical structures of both closely resemble each other and that, in the process of fermentation, 289-FO may be produced as the metabolite of the said microorganism and then converted into 289-F by continuation of the fermentation.

The said useful microorganisms producing 289-FO and 289-F of the present invention were newly separated from *Streptomyces phaeoverticillatus* and also isolated from a soil sample collected at Takatsuki City, Osaka-fu, Japan. The characteristics of the microorganisms were studied and they were recognized as new variants of *Streptomyces phaeoverticillatus*. The strain has been designated *Streptomyces phaeoverticillatus* var. *takatsukiensis*, and has been deposited in the American Type Culture Collection, Rockville, Md. and added to its permanent collection of microorganisms as ATCC 21395, 21396 and 21397.

The detailed characteristics of these variants are described hereinafter.

Among the 289-FO and 289-F-producing strains, variants newly separated from *phaeoverticillatus* NRRL 3021, and streptomycete, newly isolated from a soil sample, described above, which are variants of *phaeoverticillatus* are especially favorable for the purpose of this invention.

Strains No. 613–15 (ATCC 21395) and No. 1–125 (ATCC 21396) are representative strains separated from *phaeoverticillatus*, and strain No. 2–89 (ATCC 21397) is the streptomycete newly isolated from the above soil sample collected at Takatsuki City, Osaka, Japan. Strain No. 2–89 (ATCC 21397) bears a striking resemblance to *phaeoverticillatus*, and these newly separated strains are able to produce antibiotic 289-FO and 289-F in the culture liquid when they are cultured in a medium containing an anthraquinone sulfonate. However, these strains are different from *phaeoverticillatus* morphologically. That is, these strains do not form secondary whirls with spirals.

The cultural properties of strains No. 613–15, No. 1–125 and No. 2–89 differing from *phaeoverticillatus* are shown in the following table. Other properties are not distinguishable from each other.

From these results, it is proposed to name the streptomycetes which belong to the category indicated by these strains described above as *phaeoverticillatus* var. *takatsukiensis*.

TABLE 1
Comparison between *phaeoverticillatus* and *phaeoverticillatus* var. *takatsukiensis*

| Medium | Phaeoverticillatus var. takatsukiensis | | | Phaeoverticillatus |
|---|---|---|---|---|
| | No. 613-15 (ATCC 21395) | No. 1-125 (ATCC 21396) | No. 2-89 (ATCC 21397) | |
| Starch agar | G: Moderate; AM: White~pale yellowish brown; SM: White~pale yellowish brown; SP: Very pale yellowish brown. | G: Moderate; AM: Poor, white~light brownish gray; SM: Colorless~pale yellowish brown; SP: Almost colorless. | G: Moderate; AM: Poor, white; SM: Colorless~white; SP: None. | G: Creamy~cream yellow; AM: White~brownish white; SM: Pale yellowish brown~olive bistre; SP: Faint, pale ocher. |
| Glucose Czapek agar | G: Good; AM: Pale brown; SM: Brown~reddish brown; SP: Brown~reddish brown. | G: Good; AM: Moderate, white~pale yellowish gray; SM: Pale yellowish brown~dull yellow; SP: Dull yellow. | G: Good; AM: Brownish white; SM: Brown; SP: Brown. | G: Cream~orange buff; AM: White brownish white; SM: Buff~grain; SP: Orange buff. |
| Sucrose Czapek agar | G: Good, wrinkled; AM: Poor, white; SM: Pale yellowish brown~yellowish brown; SP: Yellowish brown. | G: Moderate; AM: Poor~scant; SM: Pale yellowish brown; SP: Pale yellowish brown. | G: Good; AM: Poor, white; SM: White~brownish white; SP: Pale reddish brown. | G: Beige~cinnamon; AM: White~brownish white; SM: Rose beige~buff; SP: Rose beige~buff. |
| Glucose Asparagin agar | G: Moderate; AM: Moderate, white~light brownish gray; SM: White~Ivory; SP: None. | G: Moderate; AM: Scant; SM: Colorless~very pale yellowish brown; SP: None. | G: Poor; AM: Scant~none; SM: Colorless~white; SP: None. | G: Cream orange buff; AM: White~brownish white; SM: Buff~grain; SP: Orange buff. |
| Morphology | Mainly monoverticillus spira | Mainly spira | Mainly spira | Biverticillus spira. |

NOTE.—G=Growth; AM=Aerial mycelium; SM=Substratal mycelium; SP=Soluble pigment.

When these strains are cultivated in an ordinary medium, very little accumulation of 289-FO or 289-F is observed in the culture broth.

However, when these microorganisms are cultivated in a medium containing anthraquinone sulfonic acid or metal salts thereof, for example sodium, potassium, ammonium, calcium and magnesium salt represented by the following formula, in addition to ordinary nutrients, a great amount of 289-FO or 289-F is accumulated in the culture broth:

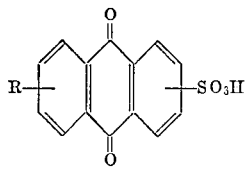

wherein R represents a radical selected from the group consisting of a hydrogen atom and a sulfonic acid radical.

According to this invention, the fermentation conditions for the production of 289-FO or 289-F are described as follows.

The accumulation of 289-FO in the culture broth reaches its maximum by fermentation for 65 hrs. The amount of 289-FO is then gradually decreased, being converted into 289-F by further continuous fermentation. Therefore, fermentation time must be properly controlled to separate 289-FO. The separation method from the broth to obtain 289-FO is completely the same as that used to obtain 289-F. Fermentation time for the purpose of obtaining 289-F must, at least, be longer than 65 hrs. For example, in order to obtain 289-F, *Streptomyces phaeoverticillatus* var. *takatsukiensis* (for example ATCC 21395) is cultured in a suitable aqueous medium containing anthraquinone sulfonic acid or metal salts thereof in addition to ordinary nutrients at a concentration of from 0.1 to 2.0% (w./v.).

As the usual media for the cultivation of Streptomyces a stationary or submerged culture may be employed, but, in practice, the submerged culture process is preferred for the production of 289-F and/or 289-FO.

Among the methods for producing 289-F, it is preferred to carry out the fermentation under aerobic conditions with agitation over a period of 3 to 5 days at a temperature in the range of 25° C. to 35° C., the most preferred range of temperature being 25° C. to 30° C.

The general procedures used for the cultivation of other Streptomyces are applicable to the cultivation of the strains of this invention.

The medium preferably contains as carbon sources, for instance, starch, glucose, maltose, or mixtures thereof; as nitrogen sources, for instance, meat extract, peptone, soybean meal, corn steep liquor, peanut meal, cotton seed meal, ammonium salts, nitrates, yeast, and mixtures thereof; and as inorganic salts, potassium salts, sodium salts, phosphates or sulfates which dissociate into ions in the culture medium. Various metal ions, for example, magnesium, manganese, zinc, cobalt, or iron may also be added in minute or trace quantity into the culture medium, if desired.

On a manufacturing scale, the most preferable composition of each culture medium varies according to the strain of Streptomyces used, as in the case of the production of antibiotics by other strains of Streptomyces.

For example, the following conditions of fermentation are suitable for the production of 289-FO or 289-F.

NUTRIENT MEDIUM

| | Percent |
|---|---|
| Meat extract | 0.5 |
| Sodium chloride | 0.5 |
| Calcium carbonate | 0.6 |
| Soybean oil | 0.1 |
| Peptone | 0.5 |
| Dried yeast | 0.3 |
| Glucose | 4.0 |
| Sodium anthraquinone-2,7-disulfonate | 0.5 |

After inoculating *Streptomyces phaeoverticillatus* var. *takatsukiensis*, the submerged cultivation is carried out at a temperature of 28° C. under aerobic conditions for 48–65 hrs. (289-FO) or 90 hrs. (289-F).

The separation of 289-FO or 289-F from the culture broth is performed as follows. (The same separation method is applicable to both 289-FO and 289-F.)

The culture broth is filtered with filter aid, the filtrate passed through a column of cation exchange resin, the eluate extracted with an organic solvent and the solvent extract evaporated to give the crude substance containing 289-FO or 289-F. As another convenient method, the above broth filtrate may be directly extracted with an organic solvent at a weakly alkaline pH without the treatment of cation exchange resin, and the solvent extract then evaporated as described above.

The crude substance containing 289-FO or 289-F thus obtained is then further purified by silica gel or alumina column chromatography.

The silica gel column chromatography (a diameter of silica gel of from 0.05 to 0.2 mm. is preferable) is carried out by using a mixture of benzene and lower alkyl alcohol as an eluent.

When using methanol as the lower alkyl alcohol, a solvent mixture of benzene-methanol in a ratio of from 9:1 to 7:3 v./v. may be used. Particularly preferable is benzene-methanol (8:2). For example, the column of silica gel (Mallincrodt silicic acid 100 mesh) is prepared with the mixture of benzene-methanol (8:2), and then the crude substance, previously dissolved in the same solvent, is applied on top of the column and eluted with the solvent. Several absorption bands colored from light yellow to red purple appear during the elution. Each fraction, collected by an automatic fraction collecter, is checked by color reaction with 2% nickel acetate (in methanol). Fractions containing 289-F and 289-FO give bluish purple and grayish blue reactions, respectively.

Each fraction is evaporated at a lower temperature under reduced pressure to dryness to obtain a crude crystalline powder (289-FO) or an amorphous powder (289-F). In the case of the alumina column chromatography, a mixture of a lower alkyl alcohol and a lower alkyl acetate saturated with water is preferably used as an eluent, such as methanol, ethanol, methyl acetate, ethyl acetate, propyl acetate or butyl acetate.

Solvents may be used in proportions of benzene: ROH of 7:1–4:1, particularly 7:1. Alumina column chromatography may be carried out in the same manner as that for the silica gel.

The crystalline powder (289-FO) separated by column chromatography is purified further by recrystallization from a small amount of acetic ester, such as ethyl acetate, to give yellow needle crystals.

289-F, obtained in amorphous form by column chromatography, is recrystallized from acetonitrile to give orange yellow crystals, and the crystals then recrystallize again from methanol to give orange needle crystals of pure 289-F. The properties of 289-FO and 289-F are described hereinafter. However, both 289-FO and 289-F are unstable compounds, so the study was performed on stable derivatives of them. The acetylated compounds are very stable and easily utilized for the determination of biological activity. The acetylation of these antibiotics renders them less toxic, thus increasing their chemotherapeutic value.

As acetylating reagents, acetic anhydride, acetylchloride, and ketene may be utilized in an inactive solvent which is able to dissolve the 289-FO or 289-F, such as chlorinated hydrocarbons, ether and acetic anhydride. The existence of a small amount of pyridine in the reaction solution assists the reaction in proceeding smoothly. Particularly, acetic anhydride in the presence of pyridine gives a good result. The acetylation is preferably conducted between 15° C. and 50° C.

For example, the reaction is carried out for about 10 to 50 hrs. at temperatures between about 30° C. and 40° C. After the reaction is completed, the reaction mixture is poured on cracked ice, adjusted to a pH of from 4.0 to 4.5, keeping the temperature below 5° C., and then extracted with an organic solvent such as chloroform, acetic ester or benzene. The extract is then washed with water, dehydrated and dried. Then the solvent is evaporated to give the crude acetylated derivative which is purified by the usual methods of purification, such as recrystallization or column chromatography. For column chromatography, alumina, silica gel or an ion exchange resin which can be utilized in an organic solvent, for instance, Amberlist-15 (registered trademark) are applicable.

The novel antibiotics, 289-FO, 289-F and Acetyl 289-F possess the following physical and chemical properties and biological activities:

(4) U.V. SPECTRUM

U.V. Spectra of each in methanol are shown in FIGS. 1–3. Absorption maxima and coefficients are as follows:

$\lambda$ m$\mu$ (E$_{1cm.}^{1\%}$)

289-FO—244(E 520), 273(E 375), 430(E 130)
289-F—244(E 807), 270(shoulder), 434(E 210)
Acetyl 289-F—238(E 603), 270(E 576), 368–370(E 160)

(5) I.R. SPECTRUM

I.R. spectra (KBr) of each are shown in FIGS. 4–6. Characteristic absorptions are as follows:

CHARACTERISTIC ABSORPTIONS $\lambda_{max.}^{KBr}$ (cm.$^{-1}$)

289-FO—3450, 1745, 1650, 1610, 1585, 1280
289-F—3450, 1620, 1610, 1585
Acetyl 289-F—1748, 1650, 1242

(6) COLOR REACTION

| | |
|---|---|
| 289-FO | (i) Grayish blue on a filter paper by nickel acetate at neutral pH. |
| | (i) Bluish purple on a filter paper by nickel acetate at neutral pH. |
| 289-F | (ii) Reddish brown on a filter paper by copper nitrate at neutral pH. |
| | (iii) Bluish purple on a filter paper by magnesium sulfate at ammonium alkaline. |
| Acetyl 289-F | (i) Negative. |
| | (ii) Negative. |
| | (iii) Negative. |

(7) SOLUBILITY

| | Very soluble in— | Soluble in— | Slightly soluble in— | Very slightly soluble in— |
|---|---|---|---|---|
| 289-FO | Chloroform, carbon tetrachloride, methanol, ethanol. | Ethyl acetate, propyl acetate | Petroleum ether, aqueous alkaline solution. | Aqueous acidic solution. |
| 289-F | | Methanol, ethanol, acetone, ethyl acetate, benzene, chloroform, acetonitrile, aqueous acidic solution. | Aqueous alkaline or neutral solution. | Water. |
| Acetyl 289-F | Benzene, chloroform, pyridine. | | n-Butanol, acetone, ethyl acetate. | Methanol, ethanol, water. |

(8) PAPER CHROMATOGRAPHY

| | Rf | Solvents | Other conditions |
|---|---|---|---|
| 289-FO | 0.40~0.45 | Acetonitrile | Toyo filter paper No. 50 developed by ascending method at 20° C. |
| 289-FO | 0.80~0.85 | Butyl acetate, dibutyl ether (3:1) | Do. |
| 289-FO | 0.28~0.39 | Ethyl acetate saturated with water | On a circular aluminum oxide paper. |
| 289-F | 0.14 | Acetonitrile | Toyo filter paper No. 50 developed by ascending method at 20° C. |
| 289-F | 0.71 | Butyl acetate dibutyl ether (3:1) | Do. |
| Acetyl 289-F | 1 | Ethyl acetate saturated with water | On a circular aluminum oxide paper. |

Rf values were checked by a yellowish spot or by coloration with nickel acetate.

(9) THIN LAYER CHROMATOGRAPHY

| | Rf | Solvents | Other conditions |
|---|---|---|---|
| 289-FO | 0.28~0.39 | Ethyl acetate saturated with water | On a circular aluminum oxide paper. |
| 289-FO | 0.81 | Ethanol-14% ammonia water (4:1) | On a silica gel (Kieselgel G: Merck Co.). |
| 289-FO | 0.06 | Ethanol-pyridine (4:1) | Do. |
| Acetyl 289-F | 0.55 | Ethanol-pyridine (4:1) | Do. |

(1) CRYSTALS

289-FO—Yellow needles (recrystallized from ethyl acetate)
289-F—Orange-yellow needles (recrystallized from acetonitrile at first, second from methanol)
Acetyl 289-F—Bright yellow needles (recrystallized from benzene and ethyl acetate)

(2) MELTING POINTS

289-FO—183°–184° C. (immediately decomposed after melting)
289-F—211.5°–213.0° C. (immediately decomposed after melting)
Acetyl 289-F—214.5°–216.5° C. (immediately decomposed after melting)

(3) ELEMENTARY ANALYSIS

| | C | H | N | O (by differentiation) |
|---|---|---|---|---|
| 289-FO | 66.90 | 6.70 | 3.71 | 22.69 |
| 289-F | 76.04 | 7.12 | 4.15 | 21.69 |
| Acetyl 189-F | 66.03 | 6.56 | 3.74 | 23.67 |

(10) OPTICAL ROTATION

| | [$\alpha$]D | Conditions |
|---|---|---|
| 289-FO | +316° | 1.5% in chloroform at 25° C. |
| 289-F | +456.7° | 1.5% in chloroform at 20° C. |
| Acetyl 289-F | +246°±2° | Do. |

(11) ACUTE TOXICITIES

| | LD$_{50}$, mg./kg. | | |
|---|---|---|---|
| | Intravenously | Intraperitoneally | Animal tested |
| 289-FO | 50~55 | 10~15 | Mouse. |
| 289-F | 12.5~20 | 12.5~20 | Do. |
| Acetyl 289-F | 150~200 | 25~50 | Do. |

(12) ANTIBIOTIC ACTIVITIES

| Microorganism | Minimum inhibitory concentration, mg./ml. | | |
|---|---|---|---|
| | 289-FO [1] | 289-F [2] | Acetyl 289-F [2] |
| Staphylococcus aureus, 209P | 3.12 | 0.39 | 0.6 |
| Micrococcus flavus | 0.39 | 0.04 | 0.78~1.56 |
| Sarcina lutea, ATCC 9341 | 0.39 | 0.09 | 0.78 |
| Bacillus subtilis, PCI-219 | 3.12 | 0.78 | 1.56 |
| Escherichia coli B | >100 | 3.12 | 25.0 |
| Pseudomonas aeruginosa | >100 | >100 | >100 |
| Proteus vulgaris | >100 | >100 | >100 |
| Streptococcus pyogenes, T-1 | 0.78 | 1.56 | 1.56 |
| Streptococcus pyogenes, S-8 | | 0.02 | 0.39 |
| Diplococcus pneumoniae, DP-1 | 1.56 | 0.09 | 0.39 |
| Lactobacillus fermenti 36 | 0.39 | 0.01 | 0.39 |
| Mycobacterium tuberculosis 607 | 3.12 | 3.12 | 0.78 |
| Candida albicans, YU-1200 | >100 | 0.78 | 25.0 |
| Trichophyton interdigitale | >100 | 50.0 | 100 |
| Aspergillus niger | >100 | >100 | >100 |
| Xantomonas oryzae | | 0.39 | 12.5 |
| Shigella dysenteriae | | 6.25 | 25.0 |
| Salmonella typhosa, 901W | | 6.25 | 100 |

[1] Determined by agar dilution method.
[2] Determined by bouillon dilution method.

(13) ANTITUMOR ACTIVITIES FOR EHRLICH ASCITES CARCINOMA

| Tumor | | Minimum complete inhibitory concentration, μg./mouse | | |
|---|---|---|---|---|
| | | 289-FO | 289-F | Acetyl 289-F |
| Ehrlich ascites carcinoma | 3 days after administration | 50 | 50 | 200 |
| Do | 7 days after administration | 25 | 12 | 50 |

The in vivo results shown above in Table 13 indicates an interesting sustained inhibition on said carcinoma, characterzed in that even an administration of a lower dose inhibits the proliferation of tumor cells at a later time. The above data was determined by the following method [1]:

10 million ascites carcinoma cells are inoculated intraperitoneally. Then an ascites sample at each time after diluted in various concentrations, is administered intrapertoneally. Then an ascites sample at each time after administration is collected and is made up into smear preparations and stained by Giemsa stain. The stained samples are compared with a control and the complete inhibitory concentration, that is, that concentration wherein the cell number falls between 0 and 5% of control cells, is determined.

With regard to the novelty of antibiotics 289-FO, 289-F and Acetyl 289-F, a comparison with known antibiotics is shown in the following list. (The indicated data represents the main points of differentiation from the antibiotics of this inventon.)

[1] J. Antibiotics Ser. A9(4), 141-146, July 1956.

It can therefore be seen that 289-FO, 289-F and Acetyl 289-F are novel and useful compounds and that the acetylation of 289-FO is the more advantageous method of obtaining Acetyl 289-F than acetylation of 289-F, since the 289-FO is obtained by the use of shorter fermentation times.

The invention will be additionally illustrated by the following examples.

Example I

An aqueous medium (1000 l.) having the following composition was prepared.

| | Percent |
|---|---|
| Glucose | 4 |
| Peptone | 0.5 |
| Dried yeast | 0.3 |
| Meat extract | 0.5 |
| Soy bean oil | 0.1 |
| Sodium chloride | 0.5 |
| Calcium carbonate | 0.6 |
| Sodium anthraquinone-2,7-disulfate | 0.5 |

In a 1500 l. fermenter, this medium was sterilized for 30 minutes at 120° C. and after cooling, 100 l. of seed-culture of strain No. 613-15 (ATCC 21395) belonging to *Streptomyces phaeoverticillatus* var. *takatsukiensis* was aseptically inoculated into the culture medium.

The fermentation was carried out at a temperature of 26-28° C. for 48 hours under agitation and aeration, aseptically.

The fermentation liquor was mixed with filter aid and filtered. The filtrate was extracted three times with one-third volume of chloroform. The extract layer was washed with water, and dehydrated with sodium sulfate. After the removal of chloroform under reduced pressure, petroleum ether was added to the residue for washing. Drying the residue, 200 g. of crude antibiotic substance, 289-FO, was obtained. The 289-FO was further purified by the following chromatography.

The crude 289-FO, dissolved in 120 ml. of a mixture of benzene and methanol (8:2), was applied to the top of a silica gel column pretreated with the same solvent. Continuously developed with the same solvent, a yellow-red purple fraction was eluted. Each fraction was collected while identifying the 289-FO by paper chroma-

| Known antibiotics | Melting point,° C. | LD 50, mg./kg. | U.V. absorption maxima λ (E) | Elementary analysis (found) | Molecular weight | I.R absorption cm⁻¹ |
|---|---|---|---|---|---|---|
| Iyomycin B[1] (The Journal of Antibiotics A. 9(3)117-123 (1964). | >270 | 4.4-5.5 (mouse i.v.) | 234-244 (560), 270(330), 430(96) | N 3.89 | 1,100 | 1,740 |
| Iyomycin B[4] (J.A.A. 9(3) 117-123 1964)). | >270 | | 243-244 (360), 256(250), 430(59) | N 8.94 | | |
| Pluramycin A (J.A.A. 9(2) 75-81 (1956)). | 177 (darkening) (crystals from EtOH). | | 345(672) | | | 1,744 |
| Do | 200-215 (darkening) crystals from EtoAc). | | 265-270 (shoulder) | | | 1,233 |
| Rubiflavin (Antimicrobial Agents and Chemotherapy 1964 68-74). | Not crystallized | | 395 (shoulder) | | 412 | |
| Hedamycin Antimicrobial Agents and Chemotherapy 1966 606-619). | 243-245 (dec.) | 0.3 (mouse i.p.) | 245 (800) $260-265 (shoulder) 430) | | | 1,660 1,630 |
| Anthracidin (Antimicrobial Agents and Chemotherapy 1963 (63-67): | | | | | | |
| A | 114-116 | | | | | |
| B | 111-112.5 | | | | | |

[1] It is considered that the molecular weight of the novel antibiotics (289-FO, 289-F and Acetyl 289-F) falls between 600 and 800.

tography and by color reaction with 2% nickel acetate reagent. The collected fraction was concentrated to dryness under reduced pressure below 40° C. After washing the residue with petroleum ether, the dried residue was recrystallized from ethyl acetate. Thus 2.8 g. of pure, crystalline 289-FO was obtained as yellow needles.

Example II

The crude 289-FO obtained in Example I was also purified by alumina column chromatography. 2 g. of crude 289-FO, dissolved in chloroform and having the insoluble residue filtered off, was applied to the top of an activated alumina column pretreated with ethyl acetate and developed with a mixture of methanol and ethyl acetate saturated with water (1:7).

In the development, the second band of absorption from the edge of the column contained 289-FO. Each eluted fraction containing 289-FO was collected while identifying it by paper chromatography and by color reaction with nickel acetate and concentrated to dryness under reduced pressure. The residue was recrystallized from ethyl acetate and gave 320 mg. of pure, crystalline 289-FO as yellow needles.

Example III

In a brown-colored flask, 500 mg. of the antibiotic substance (289-FO obtained by Example I) was dissolved in 2 ml. of acetic anhydride. After adding 0.2 ml. of pyridine to this solution, it was kept tightly closed at a temperature of 37° C. with occasional shaking and protection from light.

After 45 hours, the reaction mixture was poured into cracked ice, adjusted to pH 4.0-4.5 with 10% sodium hydroxide solution below 5° C. and extracted with 10 ml. of chloroform. The chloroform solution was washed with an equal volume of water saturated with sodium bicarbonate and again with an equal volume of water, and after drying with sodium sulfate, the solvent was distilled off under reduced pressure. The residue was washed with petroleum ether, dried and dissolved in benzene. The benzene solution was chromatographed using an alumina column previously treated with hydrochloric acid, and the column was eluted by ethyl acetate. The yellow fraction first eluted was collected and washed with water. After dehydration, the solvent was distilled off under reduced pressure. The residue was washed with petroleum ether and dried to obtain 400 mg. of the crude antibiotic substance, Acetyl 289-F. Purification of the crude Acetyl 289-F was carried out by dissolving it in 2 ml. of benzene, adding ethylacetate and allowing it to stand in a cool, dark place. Pure crystalline Acetyl 289-F as bright yellow needles was precipitated (yield 270 mg.), M.P. 214-217° C. (immediately decomposed after melting).

The physical and other properties of Acetyl 289-F were as described above.

Example IV 150 l. of a nutrient solution containing:

| | Percent |
|---|---|
| Glucose | 4 |
| Peptoné | 0.5 |
| Dry yeast | 0.3 |
| Meat extract | 0.5 |
| Sodium chloride | 0.5 |
| Calcium carbonate | 0.6 |
| Sodium anthraquinone-2,7-disulfonate | 0.5 | was sterilized for 30 minutes at 120° C. in a 300 l. fermenter. It was then cooled to 28° C. and seeded with 15 l. of the inoculum of *Streptomyces phaeoverticillatus* var. *takatsukiensis* No. 613-15 (ATCC 21395). The nutrient solution was cultivated aseptically for 90 hours at 27-28° C. under agitation and aeration. The fermentation broth was mixed with filteraid (Radiolite: registered trademark of Showa Chemical Co., Ltd., Japan) and filtered. After adjusting the pH to 8.2-8.4 with aqueous sodium hydroxide, filtrate was extracted three times, each time with a one-third volume of chloroform. The chloroform layer was washed with water, dehydrated by sodium sulfate, and concentrated to dryness under reduced pressure. By addition of petroleum ether to the residue obtained above, about 40 g. of the crude substance, containing antibiotic 289-F, was precipitated. This crude substance (5 g.) was dissolved in 30 ml. of benzene-methanol (4:1) and placed on the silica gel column (2.8 x 40 cm.) which was previously packed with benzene-methanol (4:1). When the same solvent was passed through the column, fractions colored yellow to red-purple were eluted. Examining by paper chromatography and by color reaction with 2% methanolic nickel acetate, fractions containing antibiotic 289-F were gathered and concentrated under reduced pressure below 40° C. The residue was dissolved in a small amount of ethyl acetate and crude crystals were precipitated by addition of petroleum ether. The crystals were then washed with petroleum ether and dried. 917 mg. of crude crystals of antibiotic 289-F were thus obtained. When the crude crystals were recrystallized from acetonitrile, yellowish orange sand crystals were obtained Further recrystallization from methanol gave orange or yellowish orange needles, M.P. 211.5-213.0° C. (decomposed after melting). Other properties were as described previously.

Example V

The sterilized nutrient solution of Example IV, except that sodium anthraquinone-2-sulfonate was substituted for the sodium anthraquinone-2,7-disulfonate was cultivated in a 30 l. jar fermentor seeded with 1.5 l. of the inoculum of *Streptomyces phaeoverticillatus* var. *takatsukiensis* No. 2-89 (ATCC 21397) and was cultivated at 28-30° C. Treatment of the nutrient solution in the same manner as in Example IV gave 4.5 g. of the crude substance containing antibiotic 289-F.

Example VI 2.0 g. of the crude substance, containing antibiotic 289-F, which was obtained by the process of Example IV, was purified by activated alumina column chromatography. Eluting the column by water-saturated ethyl acetate-methanol (7:1) and treating the eluate in the same manner as in Example IV, 350 mg. of the crude crystalline of antibiotic 289-F was obtained. Its properties were the same as those of Example IV.

Example VII

Antibiotic 289-F (500 mg.) was dissolved in 2 ml. of acetic anhydride in a brown vessel. 0.2 ml. of pyridine was then added and the vessel was sealed. The mixture was thereafter allowed to stand at a temperature of 37° C. for a period of 45 hrs. with occasional shaking. After completion of the reaction, the mixture was poured on ice and was adjusted to pH 4.0-4.5 with 10% sodium hydroxide while maintaining the temperature below 5° C. The mixture was then extracted with 10 ml. of chloroform with occasional shaking. The chloroform phase was washed with an equal volume of saturated aqueous sodium bicarbonate solution and then with water, dehydrated by sodium sulfate and concentrated to dryness under reduced pressure. After washing with petroleum ether, the residue was dissolved in benzene and was placed on the alumina column which had previously been treated with hydrogen chloride. Ethyl acetate was passed through the column. The first effluent, which was absorbed on the alumina column as a yellow band, was washed with water, dehydrated, and concentrated to dryness under reduced pressure. After washing the residue with petroleum ether, 370 mg. of crude crystals were obtained. The crude crystals were dissolved in 2 ml. of benzene. Ethyl acetate was then added and the solution was allowed to stand in a dark, cool place. There were obtained 259 mg. of Acetyl 289-F, M.P. 214-217° C. (immediately decomposed after melting) in the form of yellow needles.

Example VIII

Following the procedure of Example IV, but substituting equivalent amounts of ATCC 21396 for the ATCC 21395 and calcium anthraquinone-2-sulfonate for the sodium anthraquinone-2,7-disulfonate, there was obtained 850 mg. of 289-F.

Pharmaceutically acceptable, acid-addition salts of the above antibiotic compounds are also within the purview of the present invention. Particularly suitable salts are salts prepared from the hydrohalic acids, for example hydrochloric and hydrobromic acids.

As indicated above, the compounds of this invention are physiologically active substances which possess a high degree of antibacterial activity against a large number of microorganisms, including gram positive and gram negative microorganisms such as *Staphylococcus aureus, Escherichia coli, Streptococcus pyogenes, Mycobacterium tuberculosis, Shiegella dysenteriae, Salmonella typhosa* and the like.

For these purposes, they may be administered orally or parenternally in conventional dosage forms by incorporating the appropriate dosage of the compound with carriers according to standard pharmaceutical practices. Thus, perorally acceptable formultions can be prepared in the usual manner to provide an aqueous suspension, an elixir or a solid dosage unit form (e.g., tablet, powder or capsule.) For example, two-piece hard gelatin capsules may be filled with a mixture of the active ingredient and excipients (e.g., starch, talc, stearic acid and/or magnesium stearato). One-piece gelatin capsules may also be prepared using sufficient corn oil or other suitable vegetable oil, to render the compound capsulatable. Tablets may be prepared, for example, by the use of starch, lactose or other conventional excipients. Any conventionally employed tableting material may be used. Liquid preparations may be in the form of suspensions, emulsions, syrups or elixirs of the active substance in water or other liquid medium commonly employed for preparing oral pharmaceutically acceptable formulations, such as liquid paraffin or syrup elixir bases.

Parenteral formulations may be prepared, for example, by suspension of the active ingredient in sterile water or an organic liquid usually employed for injectable preparations, such as vegetable oils (e.g., olive oil), or by means of a sterile solution in a pharmaceutically acceptable organic solvent.

Such formulations may be administered to combat infections caused by organisms such as the above. For example, they may be employed in the veterinary field for treating such conditions in both large and small animals (e.g., mice, rats, dogs, cats, cattle, horses, etc.) at dosages ranging from about 0.5 to 20 mg./kg. of body weight daily in single or divided dosages over a period of about 5 days. The preferred form of administration is intraperitoneally. 289-FO is preferably administered at dosages of about 0.5 to 6 mg./kg./day, 289-F at dosages of about 0.6 to 8 mg./kg./day and Acetyl 289-F at dosages of about 1.25 to 20 mg./kg./day.

The compounds of this invention may also be employed topically in the form of a powder or cream containing about 0.1 to 1% by weight of the active ingredient.

As antibacterial agents, the compounds of this invention may also be employed as disinfectants. For this purpose, they are dissolved or suspened in water, preferably also containing a detergent, at a concentration of about 0.5% to about 10% and may be used as washes to disinfect floors, walls, tables and the like.

The compounds of the present invention, as illustrated above, also possess cytotoxic activity by inhibiting the growth of Ehrlich ascites cells as shown by the in vivo (mouse) test, above. Dosages to be employed for the treatment of such conditions would be within the range of about 5 to 50 mg./kg./day in divided doses.

What we claim is:

1. An antibiotic selected from the group consisting of 289-F which is soluble in methanol, ethanol, acetone, ethyl acetate, benzene, chloroform and acetonitrile and insoluble in an aqueous alkaline solution, melting at 211.5–213.0° C. (immediately decomposes after melting), having the following elemental analysis: C, 67.04%; H, 7.12%; N, 4.15%; O, 21.69%, exhibiting characteristic absorption in the infrared region of spectrum when tableted with KBr at the following frequencies expressed in reciprocal centimeters: 3420, 1620, 1610 and 1585, and having an optical rotation of $[\alpha]_D^{20}+456.7°$ when dissolved in chloroform at a concentration of 1.5%, and the pharmaceutically acceptable acid-addition salts thereof.

2. The antibiotic of claim 1, wherein said antibiotic is acetylated.

3. The antibiotic of claim 1, whose pharmaceutically acceptable addition salt is formed from a non-toxic hydrohalic acid.

4. An antibiotic selected from the group consisting of 289-FO which is very soluble in chloroform, carbon tetrachloride, methanol and ethanol, soluble in ethyl acetate and proply acetate and insoluble in petroleum ether, melting at 183–184° C. (immediately decomposes after melting), having the following elemental analysis: C, 66.90%; H, 6.70%; N, 3.71%; O, 22.69%, exhibiting characteristic absorption in the infrared region of spectrum when tableted with KBr at the following frequencies expressed in reciprocal centimeters: 3450, 1745, 1650, 1610, 1585, and 1240, and having an optical rotation of $[\alpha]_D^{25}+316°$ when dissolved in chloroform at a concentration of 1.5%, and the pharmaceutically acceptable acid-addition salts thereof.

5. The antibiotic of claim 4 wherein said antibiotic is acetylated.

6. The antibiotic of claim 4, whose pharmaceutically aceptable addition salt is formed from a non-toxic hydrohalic acid.

7. An antibiotic selected from the group consisting of acetyl 289-F which is very soluble in benzene, chloroform, and pyridine and very slightly soluble in methanol, and ethanol, having the following elemental analysis: C, 66.03%; H, 6.56%; N, 3.74%; O, 23.67% exhibiting characteristic absorption in the infrared region of spectrum when tableted with KBr at the following frequencies expressed in reciprocal centimeters: 1748, 1650, and 1242, and having an optical rotation of $[\alpha]_D^{20}+246°\pm2°$ when dissolved in chloroform at a concentration of 1.5%, and the pharmaceutically acceptable acid-addition salts thereof.

8. The antibiotic of claim 7, said antibiotic is acetylated.

9. The antibiotic of claim 7, whose pharmaceutically aceptable addition salt is formed from a non-toxic hydrohalic acid.

10. A process for producing the antibiotic 289-F which comprises cultivating a strain selected from the group consisting of ATCC 21395, ATCC 21396 and ATCC 21397, belonging to *Streptomyces phaeoverticillatus* under submerged aerobic conditions in an aqueous carbohydrate solution containing an anthraquinone sulfonic acid or a metal salt thereof in addition to a nitrogenous nutrient, wherein the said anthraquinone sulfonic acid is represented by the formula

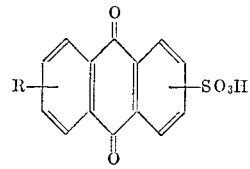

wherein R is selected from the group consisting of a hydrogen atom and a sulfonic acid radical, said process being carried out for a period of time greater than 50 hours.

11. The process of claim 10 wherein the cultivation is continued for not less than 70 hours.

12. The process of claim 10 wherein the concentration of anthraquinone sulfonic acid or metal salt thereof is from 0.1 to 2.0% (w./v.).

13. The process of claim 10 wherein the metal salt of the anthraquinone sulfonic acid is selected from the group consisting of sodium, potassium, ammonium, calcium and magnesium salts.

14. The process of claim 10 wherein the anthraquinone sulfonate is sodium anthraquinone-2,7-disulfonate.

15. The process of claim 10, within said cultivation is carried out over a period of from 3 to 5 days at a temperature of from 25° C. to 35° C.

16. The process of claim 15, wherein said temperature ranges from 25° C. to 30° C.

17. A process for producing the antibiotic 289-FO which comprises cultivating a strain selected from the group consisting of ATCC 21395, ATCC 21396 and ATCC 21397, belonging to Streptomyces phaeoverticillatus under submerged aerobic conditions in an aqueous carbohydrate solution characterized by containing an anthraquinone sulfonic acid or a metal salt thereof in addition to a nitrogenous nutrient, wherein the said anthraquinone sulfonic acid is represented by the following formula:

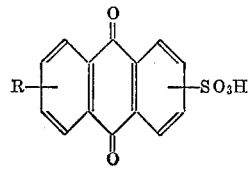

wherein R is selected from the group consisting of a hydrogen atom and a sulfonic acid radical, said process being carried out for a period of less than 65 hours and sufficient to produce said antibiotic.

18. The process of claim 17 wherein the cultivation is continued for not less than 48 hours and not more than 65 hours.

19. The process of claim 17 wherein the concentration of anthraquinone sulfonic acid or metal salt thereof is from 0.1 to 2.0% (w./v.).

20. The process of claim 17 wherein the metal salt of the anthraquinone sulfonic acid is selected from the group consisting of sodium, potassium, ammonium, calcium and magnesium salts.

21. The process of claim 17 wherein the anthraquinone sulfonate is sodium anthraquinone-2,7-disulfonate.

References Cited
UNITED STATES PATENTS 3,118,812　1/1964　Gaeumann et al. ____ 424—121
3,183,155　5/1965　Camiener et al. _____ 424—121

SAM ROSEN, Primary Examiner

U.S. Cl. X.R.

195—81